Aug. 6, 1957     H. W. VAN NESS     2,802,146
ELECTRIC DISCHARGE APPARATUS
Filed Sept. 30, 1954     3 Sheets-Sheet 1

WITNESSES

INVENTOR
Hubert W. Van Ness
BY
ATTORNEY

United States Patent Office 2,802,146
Patented Aug. 6, 1957

2,802,146

ELECTRIC DISCHARGE APPARATUS

Hubert W. Van Ness, East Aurora, N. Y., assignor to Westinghouse Electric Corporation, East Pittsburgh, Pa., a corporation of Pennsylvania Application September 30, 1954, Serial No. 459,332

8 Claims. (Cl. 315—166)

This application relates to my application Serial No. 459,331 filed September 30, 1954 and assigned to Westinghouse Electric Corporation which is being filed concurrently herewith. The latter applicaton discloses certain details not disclosed in my present application and, thus, supplements my present application. To the extent practicable, the same labeling is used in my present application and in the application filed concurrently herewith. The latter application is incorporated in this application by reference.

My invention disclosed in this application relates to electric discharge apparatus and has particular relation to electric resistance welding apparatus in which the control is effected by means of electric discharge devices. Such resistance welding apparatus includes a welding transformer having a high step-down ratio. In using the apparatus for welding, current of the order of 1,000 amperes is supplied at 220 or 440 volts or at higher voltages to the primary of this transformer through electric discharge valves, such as ignitrons, for example, which may be connected in inverse parallel between the primary and the supply. The secondary of the transformer is connected directly across the work and may draw as high as 10,000 to 50,000 amperes at 4 to 10 volts.

Recently, it has been found to be advantageous to provide the welding transformer with a highly magnetizable core, such as a core of oriented silicon steel, and welding transformers with such cores have come into wide use. Such a core is sold under the trademark Hipersil and is called in the trade a C core or a Type C core. In welding with apparatus in accordance with the teachings of the prior art, including a welding transformer with a core of oriented silicon steel, difficulties have been encountered. It has been found that the transformer has a tendency to draw excessively high currents during the welding interval and particularly at the beginning of the welding interval.

It is, accordingly, broadly an object of my invention to provide electric resistance welding apparatus including a welding transformed with a highly magnetizable core in which the excessive currents encountered in the above-described prior art apparatus shall be suppressed.

Another object of my invention is to provide apparatus for supplying a transformer having a highly magnetizable core during intermittent intervals with current, the amplitude of which shall be maintained within predetermined limits.

An incidental object of my invention is to provide a novel circuit particularly suitable for inclusion in electric resistance welders in which the current is supplied through electric discharge devices, such as ignitrons connected in inverse parallel.

Another incidental object of my invention is to provide a novel control circuit for an electric discharge device, such as a thyratron.

My invention arises from the realization that a core, such as a Type C core, does not provide a continuous magnetic path, but inherently has a very narrow air gap. Because of this air gap, the residual magnetism in the core which is present at the end of a welding pulse is relatively small, approaching zero. Each new welding pulse may then be regarded as started at substantially zero magnetism of the core. Under the circumstances, the initiation of the current flow through the primary of the transformer, as early in the first half-period of each welding pulse as is desirable for the welding operation, and sometimes even at the beginning of this half-period, has a tendency to raise the flux density of the core to a magnitude beyond the knee of the magnetization curve. Since the core has a high magnetization, the tendency of this increase in the flux density is to cause the core to become highly saturated and results in the objectionable excessive current which has been encountered in using the transformers described above.

In accordance with the broader aspects of my invention, I provide electric resistance welding apparatus including a transformer having a highly magnetizable core, specifically one composed of oriented silicon steel, the primary of which is supplied through electric discharge valves connected in anti-parallel, which apparatus is characterized by the fact that the first of the valves to be rendered conducting during each welding pulse becomes conducting late in its first positive half-period of the supply potential, and this valve and the one connected in inverse parallel to it are rendered conducting early during each of the succeeding half-periods of the welding pulse at instants corresponding to the desired welding current. The above-described control of the electric discharge valves is effected by control circuits for the valves which operate automatically to produce the desired wave form of the welding current.

Since the first of the valves which is to be rendered conducting is fired late in its first positive half-period, the current flow through this valve and through the primary of the welding transformer is relatively low, and the tendency to produce the saturation and the resulting excessive current during this half-period is suppressed. At the beginnings of the subsequent half-periods, the flux density of the core corresponds to the current transmitted during the first half-period, and a relatively large swing of welding current of the opposite polarity does not produce excessive flux density of the opposite polarity. For example, assume that the valve is rendered conducting one quarter-period after the zero point during the first positive half-period. Under such circumstances, the flux density in the core reaches its maximum at the beginning of the succeeding half-period during which the other valve is to conduct. The latter valve is then rendered conducting with the flux density at a substantial magnitude but of opposite polarity than that produced by this latter valve. The change in flux density produced by the total swing of current in the latter valve is from the maximum density of opposite polarity to a corresponding flux density of polarity corresponding to the current in the latter valve, and this latter flux density is not such as to saturate the core.

In apparatus according to my invention, the control circuits for the discharge valves are such that a specific one of the valves, which may be called the leading valve, is first rendered conducting during any weld interval or welding pulse and thereafter conducts during alternate half-periods, and the other valve, which may be called the following valve, conducts during the intervening half-periods. In accordance with the specific aspects of my invention, the control circuit of the leading valve includes a charge storing component, such as a capacitor which is charged during the half-periods during which the anode-cathode potential for the following valve is positive and only so long as the following valve does not conduct during these half-periods. During the first half-period during which the leading valve conducts, the charge on this capacitor which was impressed on it during the just preceding negative half-period of potential for the leading valve assures that the leading valve is rendered conducting late in this first positive half-period. During subsequent positive half-periods for the leading valve the capacitor, not having been charged during the intervening half-periods because the following valve conducted, permits the leading valve to conduct early during the half-periods.

The novel features that I consider characteristic of my invention are discussed generally above. The invention itself, both as to its organization and its manner of operation, together with additional objects and advantages thereof, will be understood from the specific embodiment disclosed in the following drawings, in which.

Figure 1:
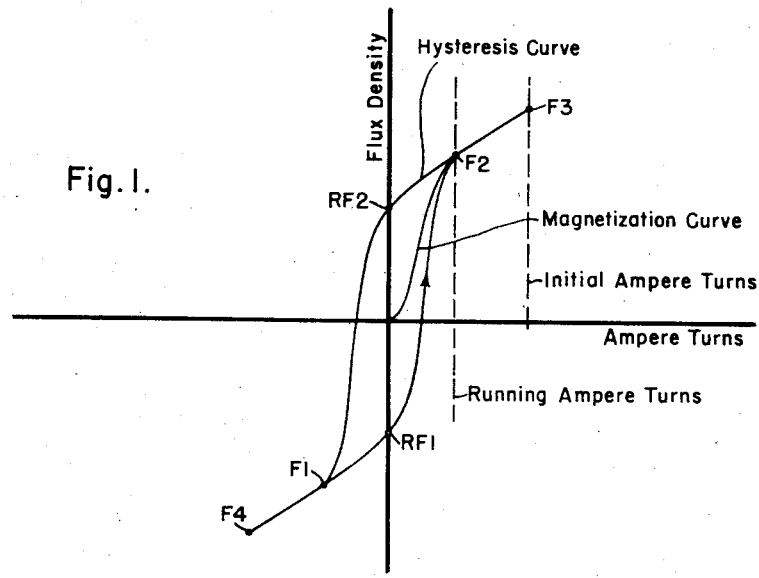
Figure 1 is a graph presenting the hysteresis curve for a transformer having a core of ordinary iron or steel.
Figure 2:
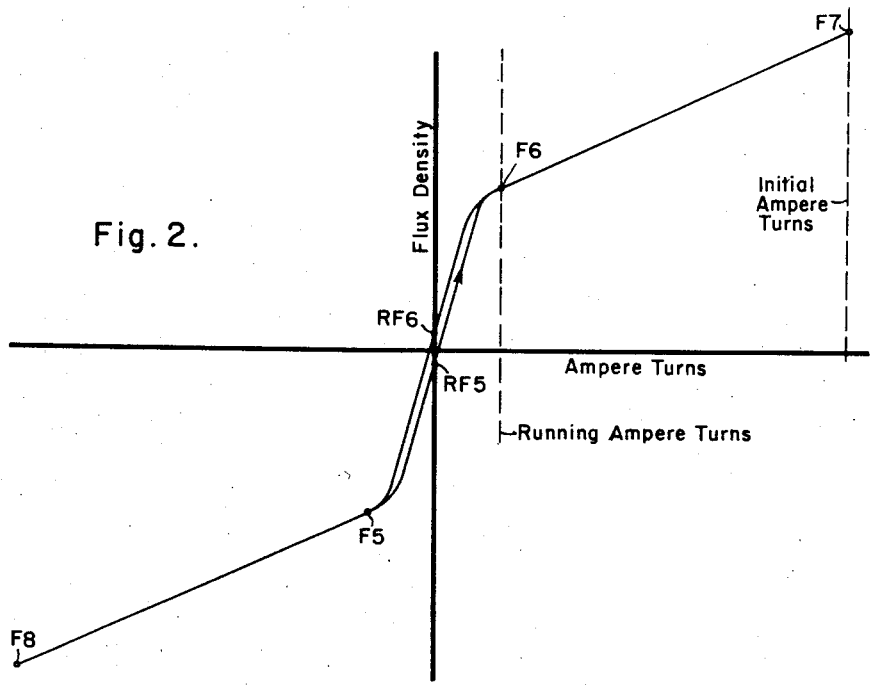
Fig. 2 is a graph presenting the hysteresis curve for a transformer having a core of oriented silicon steel.

Figs. 1 and 2 are presented to help in the explanation of the concepts on which my invention is based. Fig. 1 shows the magnetization curve and the hysteresis curve for a transformer of which the core is composed of ordinary iron or steel. In this curve, flux density is plotted vertically and ampere turns horizontally. In this case, the hysteresis curve is a loop having a substantial area, and the change in magnetization for changes in the ampere turns is relatively gradual.

The welding transformer is so designed and the core area of the iron so dimensioned that during normal operation the flux density varies, for example, from F1 to F2, and from F2 to F1 as the polarity of the current supplied through the primary varies. At the end of any welding pulse, the core is left in a condition under which residual flux RF1 or RF2 remains in it, and the polarity of the current supplied through the primary at the beginning of a subsequent welding interval is usually such as to counteract the residual flux. Thus, a selection of polarity of the initial current may be such that with the residual flux at point RF1 the flux density change is in a direction from RF1 to F2; that is, in the direction of the arrow in Fig. 1. In this case, the flux density initially rises to a higher point than F2, to F3 say, since the excitation of the transformer starts at the point RF1, rather than at the point F1 which is below RF1. Since the permeability of the core corresponding to the point F3 is substantial, there is no substantial increase in the current flow through the primary during the first half-period of a welding pulse. Correspondingly, if the residual flux density is initially at the point RF2, the flux density decreases to a magnitude corresponding to the point F4 during the initial half-period of the welding pulse. This flux density is higher than that corresponding to the point F1, but the permeability is still substantial and the current flow through the primary is not excessively high.

A different situation arises for a transformer having a core of oriented silicon steel, or the like; the hysteresis curve for this core is presented in Fig. 2. The transformer is usually so designed that its flux density varies along the curve from a magnitude corresponding to F5 to a magnitude corresponding to F6 and reversely from F6 to F5 as the current flow through the primary alternates. But, in this case, the core has an air gap so that the residual flux density is low having magnitudes corresponding to RF5 and RF6, for example, which are approximately zero.

Now assume that the residual flux density during the initial half-period of a welding pulse corresponds to RF5. Current supplied during this initial half-period beginning at an instant early in the half-period reaches a substantial magnitude. This current is of such polarity that the decrease and subsequent increase in flux density varies along the hysteresis curve from RF5 to F6; that is, in the direction of the arrow. But, since the core is in a condition of approximately demagnetization, initially the rise in flux density is not to point F6, but to a substantially higher point F7. Correspondingly, the current flow with the residual flux corresponding to the point RF6 is during the initial half-period, such as to produce flux density corresponding to point F8. The permeability of the core corresponding to points F7 and F8 is low, and the current flow through the primary is then very large and produced undesirable results.

Figure 3:
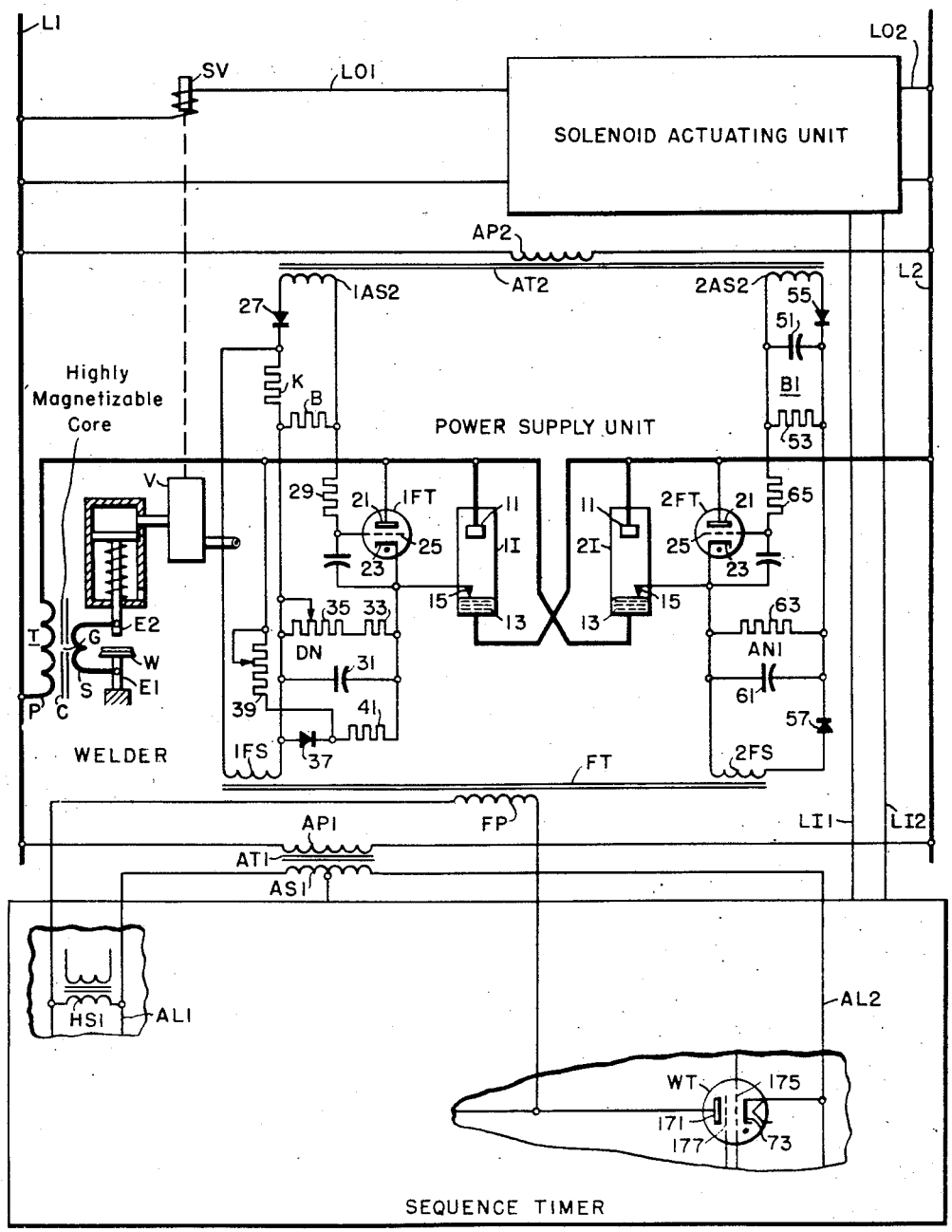
Fig. 3 is a circuit diagram of a preferred embodiment of my invention.

In accordance with my invention this disadvantage is eliminated by supplying less current during the first half-period of a welding pulse than during the succeeding half-periods and thus suppressing the initial over-magnetization of the core of the welding transformer just described. This object is accomplished with the apparatus shown in Fig. 3 which includes a welder, a power supply unit, a sequence timer and a solenoid actuating unit. This apparatus is supplied from main supply buses or conductors L1 or L2 which may be connected to the buses of a commercial supply such, for example, as a 220 or a 440 volt supply. The sequence timer operates at a lower voltage than is derivable from the conductors L1 and L2 and it is supplied from auxiliary conductors AL1 and AL2 which derive their power from a transformer AT1 having a primary AP1 connected to the conductors L1 and L2 and a secondary AS1 connected to the conductors AL1 and AL2.

The welder includes a welding transformer T having a primary P and a secondary S and a core C of highly magnetizable material, preferably oriented silicon steel, having a narrow air gap G. A pair of welding electrodes E1 and E2 are connected across the secondary S. Electrode E2 is movable into and out of engagement with work W under the action of a fluid operated piston in a fluid cylinder. The flow of fluid to the piston is controlled by a valve V which is actuable by a solenoid SV controlled from the solenoid actuating unit.

The power supply unit includes a pair of electric discharge valves or electric discharge devices such as a pair of ignitrons 1I and 2I. Each ignitron has an anode 11, a cathode 13 and an ignitor 15. The anodes 11 and cathodes 13 are connected in inverse or anti-parallel between the supply conductors L1 and L2 and the primary P.

A firing thyratron 1FT and 2FT, respectively, is associated with each ignitron 1I and 2I. Each of these thyratrons has an anode 21, a cathode 23, and a control electrode 25. The anode 21 of each thyratron 1FT and 2FT is connected to the anode 11 of the associated ignitrons 1I and 2I, respectively. The cathode 23 of each thyratron 1FT and 2FT is connected to the ignitor 15 of the associated ignitron.

Between the control electrode 25 and the cathode 23 of thyratron 1FT facilities are provided for impressing a composite potential. One component of this potential is a blocking bias derived from the supply L1 and L2 through a transformer AT2 having a primary AP2 and a pair of secondaries 1AS2 and 2AS2. This potential is impressed across a resistor B through a rectifier 27 and a second resistor K. The resistor B is connected at one terminal to the control electrode 25 of the thyratron 1F2 through a grid resistor 29. The rectifier 27 is so poled that the point on the resistor B at which the control electrode is connected is electrically negative relative to the other terminal of the resistor B.

Current flow through resistor B may be blocked and its biasing effect suppressed by potential derivable from a firing transformer FT which is supplied from the sequence timer and which has a primary FP and secondaries 1FS and 2FS. The secondary 1FS of this transformer is connected across the resistor K. Transformers FT and AT2 are so related that the potential supplied by transformer 1FS counteracts and blocks the potential supplied across the resistor B during the half-periods when it is impressed through the rectifier 27. Preferably, the potential supplied through the secondary 1FS should be in opposite phase to the potential supplied through the secondary 1AS2 and of substantially larger magnitude. Under such circumstances, the flow of current is entirely blocked when secondary 1FS carries current.

Another component of control potential is derived from a network DN including a capacitor 31 shunted by a fixed resistor 33 and a variable resistor 35. This network DN is connected at one terminal to the anode 21 of the thyratron 1FT through a rectifier 37 and a variable resistor 39, the rectifier being so poled as to conduct positive current from the network to the anode. By positive current, I mean the flow of positive ions or holes as distinct from electrons. The other terminal of the network DN is connected to the cathode of thyratron 1FT, and through the ignitor 15 and the cathode 13 of ignitron 1I, to the conductor L2. A resistor 41 is connected between the rectifier 37 and the latter terminal. The network DN is connected to the junction of the resistor B through which the first component of potential is impressed and the resistor K through which this first component of potential is blocked.

It is seen that in the quiescent condition of the apparatus the network DN is charged during the half-periods during which conductor L2 is electrically positive relative to conductor L1, current flowing in a path extending from conductor L2 through the cathode 13 and ignitor 15 of ignitron 1I, the network DN, the rectifier 37, the variable resistor 39, the primary P to the conductor L1. The variable resistor 39 is of so high resistance that this current flow does not damage the ignitor 15 of ignitron 1I, and of so low resistance that the network charges to a substantial potential during each of the half-periods. The variable resistor 35 of the network DN is preferably so set that when the capacitor is charged, it discharges to a low potential in a time interval of the order of a half-period of the supply.

Blocking bias is supplied in the control circuit of thyratron 2I through a network B1 consisting of a capacitor 51 shunted by a resistor 53. This network is supplied through a rectifier 55 from the secondary 2AS2. Potential for counteracting the bias impressed by network B1 is derivable from a network AN1 supplied from the secondary 2FS through a rectifier 57. The network AN1 includes a capacitor 61 shunted by a resistor 63. The bias network B1 is connected at one terminal to the control electrode 25 of the thyratron 2F2 through a grid resistor 65; at the other terminal, it is connected through the network AN1 to the cathode 23 of the thyratron 2FT.

In a system which we have found to operate satisfactorily, the power supply unit includes the following components:

| | |
|---|---|
| Ignitrons 1I and 2I | Selected in accordance with the current desired. |
| Thyratrons 1FT and 2FT | Usually WL5684. |
| Grid resistors 29, 65 | .1 megohm. |
| Potential across 1AS2 and 2AS2 | 45 volts. |
| Resistor B | 6800 ohms. |
| Resistor K | 6800 ohms. |
| Potential across 1FS | 150 volts peak. |
| Capacitor 31 | .1 microfarad. |
| Variable resistor 35 | 25,000 ohms. |
| Fixed resistor 33 | 10,000 ohms. |
| Variable resistor 39 | 10,000 to 25,000 ohms. |
| Resistor 41 | 10,000 ohms. |
| Capacitor 51 | .5 microfarad. |
| Capacitor 61 | .1 microfarad. |
| Resistor 53 | 47,000 ohms. |
| Resistor 63 | 33,000 ohms. |
| Potential 2FS | 150 volts peak. |
| Surge suppressor capacitors (not labeled) | .002 microfarad. |

The sequence timer may be of any type available in the art. Specifically, the sequence timer disclosed in my concurrently filed application (Case 28,355) may be included. Such a sequence timer has a well thyratron WT having an anode 171, a cathode 173, a first control electrode 175, and a second control electrode 177. This weld thyratron WT is in the operation of the sequence timer maintained non-conducting except during the welding interval.

In apparatus in accordance with my invention, the anode 171 of the weld thyratron WT is connected through the primary FP and the secondary HS1 of one of the heater transformers of the sequence timer to the conductor AL1 and the cathode 173 is connected to the conductor AL2. The heater secondary HS1 is of very low resistance and thus, in effect, the primary FP is connected through the thyratron WT between the conductors AL1 and AL2 and carries current when the thyratron WT conducts.

The solenoid actuating unit may also be of any type available in the art and specifically the solenoid actuating unit disclosed in my concurrently filed application (Case 28,355) is included. This unit is represented as a block herein but is shown in detail in the concurrently filed application (Case 28,355). For the purpose of the present application it is only necessary to state that the solenoid actuating unit includes a pair of conductors LO1 and LO2 which carry current during the time during which the electrodes E1 and E2 are to remain in engagement with the work W. The connection between the sequence timer and the solenoid actuating unit is through a pair of conductors LI1 and LI2 which transmit a signal from the sequence timer to actuate the solenoid actuating unit and thus to energize the conductors LO1 and LO2 so that they carry current. The conductors LO1 and LO2 are supplied from the conductors L1 and L2 and are connected between these conductors in series with the coil of the solenoid SV.

Figure 4:
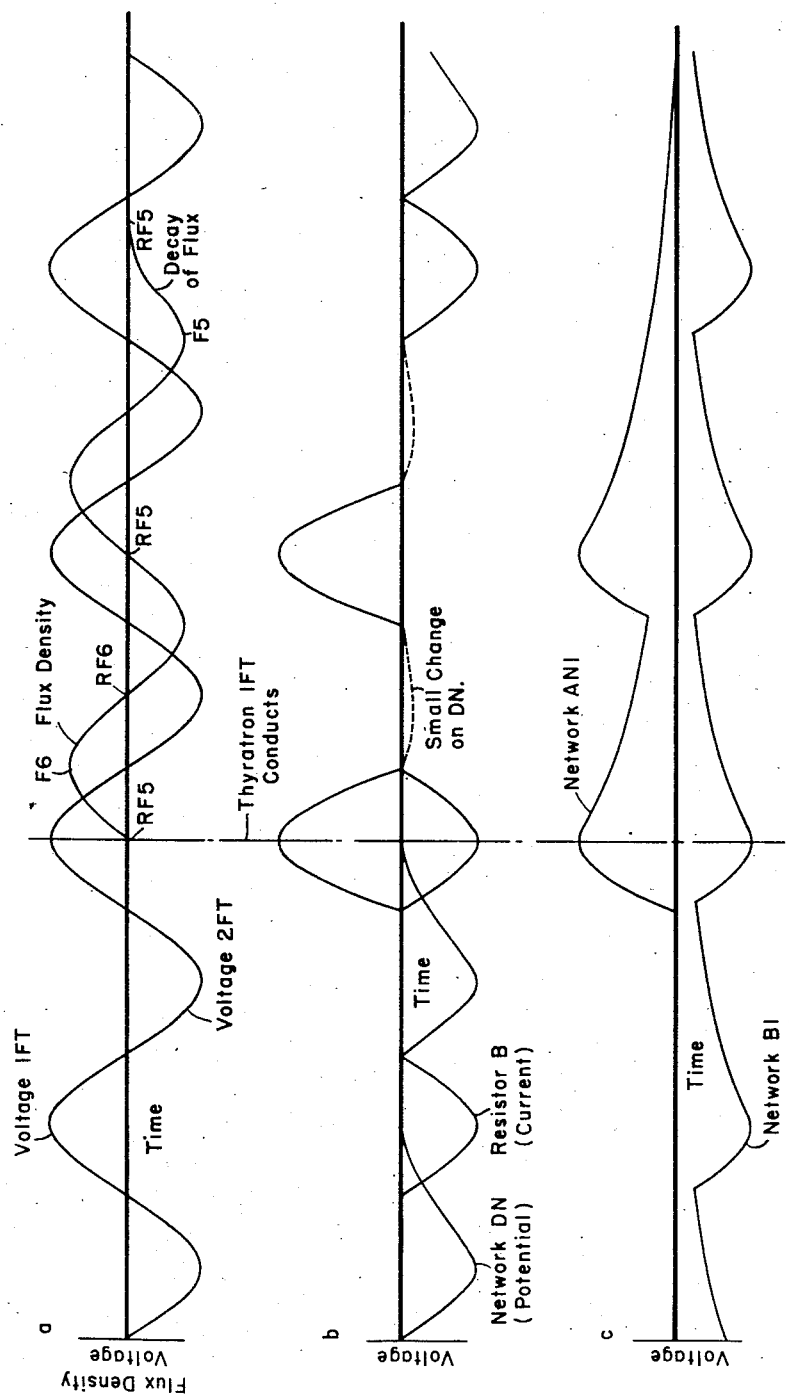
Fig. 4 is a graph illustrating the operation of the apparatus shown in Fig. 3.

In describing the apparatus in its standby condition and in describing its operation, I will refer to Fig. 4, in which graps $a$, $b$, and $c$ are presented. Graph $a$ plots the anode voltage impressed on the firing thyratrons 1FT and 2FT as a function of time and the flux density in the core C of the transformer T as a function of time. Voltage and flux density are plotted vertically and time horizontally. In graph $b$ the potentials impressed across the resistor B, resistor K, and network DN are presented as a function of time, voltages being plotted vertically and time horizontally. In graph $c$ the potentials impressed across the networks BN1 and AN1, respectively, are plotted as a function of time, voltage being plotted vertically and time horizontally.

In the standby condition of the apparatus the circuit breakers or disconnect switches (not shown) between the conductors L1 and L2 and the commercial supply buses are closed and the conductors L1 and L2 are energized. The cathodes of the various thyratrons in the power supply unit, the sequence timer, and the solenoid actuating unit are energized and certain of the thyratrons in the sequence timer are also conducting. But, in the standby condition of the apparatus, the conductors LO1 and LO2 are not conducting and thyratron WT is not conducting, and the primary FP is not carrying current. The secondaries 1FS and 2FS are, thus, not carrying current, and resistor K in series with the resistor B and the network AN1 are both deenergized. The network B1 is, at this time, charged during the half-periods during which the anode of thyratron 1FT is positive relative to its cathode and the potential produced by this charge is represented by the loops below the time as is graph $c$ of Fig. 4. Under such circumstances, thyratrons 2I and 2FT are not conducting, and the network DN is charged during the half-periods during which the anode of thyratron 2FT is positive relative to its cathodes. The potential on the network DN is represented by the first loop at the extreme left in graph $b$. In addition, during the half-periods during which the potential of the thyratron 1FT is positive relative to its cathode, current is conducted from the secondary 1AS2 through the resistor B since there is no potential across secondary 1FS. This current is of negative polarity with reference to the cathode of thyratron 1FT and is represented by the second loop of graph *b* of Fig. 4. At this time, the voltage across resistor B and the voltage on network DN are effective to maintain thyratron 1FT. The potential between the anodes 21 and the cathodes 23 of thyratrons 1FT and 2FT at this time is represented by the first, second and third loops on the left in graph *a*.

When a welding operation is to be carried out the work W is properly positioned on electrode E1 and a switch available to the operator, which is not shown but is usually provided in the sequence timer, is actuated. The actuation of this switch initiates the operation of the sequence timer. Initially a signal is transmitted through the conductors LI1 and LI2 to energize the solenoid actuating unit so that current flows through the conductors LO1 and LO2 and through the solenoid SV. The solenoid SV is now actuated, opening the valve V and causing the electrode E2 to engage the work W and the adequate pressure to be applied between the electrodes E1 and E2 and the work W.

At the end of a predetermined time interval following the transmission of a signal through the conductors LI1 and LI2 the weld thyratron WT is rendered conducting. A pulse is now transmitted through the primary FP, inducing corresponding potential pulses in the secondary, and the potential pulse represented by the first loop above the time axis in graph *b* now appears across resistor K. This potential is of opposite polarity to the potential produced at the time time across resistor B and the current flow from secondary 1AS2 which produces the potential across resistor B is blocked so that the potential across resistor B disappears. The absence of this potential is indicated in graph *b* of Fig. 4 by the absence of a loop just below the loop representing the potential across K. The absence of blocking potential across resistor B does not immediately permit thyratron 1FT to conduct because during the just preceding half-period the network DN was charged and at the beginning of the half-period during which the potential is impressed on resistor K this network is still discharging and the control potential impressed by network DN is at the beginning of the half-period sufficient to maintain thyratron 1FT non-conducting. But, during an interval having a duration of the order of one quarter-period after the initiation of the potential on resistor K, the network DN has discharged sufficiently to permit thyratron 1FT to conduct. The thyratron then conducts as indicated by the line in Fig. 4. The conduction of thyratron 1FT causes the firing of ignitron 1I and current flows from conductor L1 through primary P of ignitron 1I to conductor L2. This current flow is represented by the shading under the second quarter cycle of the fourth loop from the left of graph *a*. It is to be kept in mind that the curve above the shading does not correspond to the voltage either across the thyratron 1FT or the ignitron 1I. The shading is presented simply to help the understanding of the operation.

The current flow through the primary P and the ignitron 1I causes the flux density to increase from the initial magnitude assumed to be at RF5 (Fig. 2) which is substantially zero to the magnitude at F6 and then to decrease to the magnitude at RF6. This change in flux density, as presented by the first flux density loop in graph *a*, is displaced in phase by a quarter-period with reference to the current flow through the primary P. The flux density then reaches the maximum magnitude corresponding to point F6 at approximately the instant when the voltage impressed across thyratron 1FT and thus across ignitron 1I passes through zero. If the power factor of the welder approaches 1, the current flow through the primary P also passes through zero at this point. If not, the zero point in the current flow is delayed by an angle corresponding to the power factor. In any event, the flux density is at a high positive magnitude F6 in the region where the current flow is decaying to zero.

When the primary FP is supplied with current it also induces potential in the secondary 2FS which charges the network AN1. Potential as represented by the loops above the axis in graph *c* thus appears on the secondary AN1. This potential is impressed in phase with the potential on resistor K but the resistance on capacitor AN1 permits the potential on the capacitor to decay at such a rate that when the anode potential of thyratron 2FT becomes positive the blocking potential B1 is counteracted and thyratron 2FT becomes conducting. The thyratron then fires ignitron 2I and current is transmitted in a circuit extending from conductor L2 through the ignitron 2I, the primary P to the conductor L1. This current is of opposite polarity to the current transmitted through ignitron 1I.

Assuming a high power factor, the flow of this current starts near the beginning of the positive half-period of anode-cathode potential impressed on ignitron 2I. At this point the flux density in the core C of transformer T is at the high magnitude corresponding to point F6. As the current increases and decreases through the primary P the flux decays to a magnitude corresponding to RF6 and rises to the opposite polarity. This change is represented by the drooping half of the flux density curve in graph *a*. Eventually the flux density reaches the magnitude F5. This change in flux density is again displaced in phase with reference to the potential impressed on ignitron 2I by approximately one quarter-period and is at the maximum magnitude F5 when the potential of ignitron 2I is passing through zero.

Ignitron 2I is, in effect, in parallel with the charging circuit for the network DN. Since the potential drop across ignitron 2I while it is conducting is relatively small, the charge on network DN during the interval during which ignitron 2I conducts is negligible and the network is not charged. This condition is represented by the broken line shallow loop in graph *b*. At this time, also thyratron WT conducts again and a voltage pulse appears across resistor K to prevent conduction from secondary 1AS2. No voltage then appears on resistor B. Since network DN is now substantially uncharged at the beginning of the half-period during which the anode potential of thyratron 1FT is positive, thyratron 1FT now fires at the beginning or near the beginning of the half-period and ignitron 1I is now rendered conducting at the beginning of this half-period. But at this time the flux density has the magnitude corresponding to point F5 and not the magnitude of approximately zero corresponding to point RF5. While ignitron 1I now conducts, the flux swings from the magnitude corresponding to F5 to a magnitude corresponding to F6 and not to a magnitude producing excessive saturation (as at point F7). At the end of this half-period, network AN1 is still effective and thyratron 2FT conducts firing ignitron 2I. The flux density in core C then swings from a magnitude corresponding to point F6 to a magnitude corresponding to point F5, and it is at the magnitude corresponding to point F5 at the beginning of the half-period of anode-cathode potential on thyratron 1FT.

But at this time the conduction of thyratron WT in the sequence timer is terminated. Potential is not now impressed across resistor K and the potential across resistor B becomes effective to prevent thyratron 1FT from conducting and ignitron 1I is then not fired. The weld interval is then at an end. The flux in core C decays to the magnitude RF5 as shown in graph *a*.

Assuming the sequence timer to be of the high-speed type disclosed in my concurrently filed application (Case 28,355) the closed time for the electrodes E1 and E2 times out while thyratron WT is conducting and the current flow through conductors LO1 and LO2 is interrupted. Solenoid SV is deenergized closing valve V and permitting electrode E2 to be retracted from the work W. During an off interval the sequence timer is now reset and the work W may be reset for another weld.

It is seen that in accordance with my invention, I have provided welding apparatus including a welding transformer with a highly magnetizable core which operates in such manner as to prevent excessive saturation of the core and thus excessive current. In arriving at this invention, I have provided not only novel welding apparatus but also a novel control circuit for a thyratron.

While I have shown and described a certain specific embodiment of my invention, many modifications thereof are feasible. My invention, therefore, is not to be restricted except insofar as is necessitated by the spirit of the prior art.

I claim as my invention:

1. Apparatus for supplying power from an alternating current source through a transformer having a primary and a core of highly magnetizable material with an air gap including in combination a leading electric discharge path having an anode, a cathode and a control electrode, a following electric discharge path having an anode, a cathode and a control electrode, means for connecting said anodes and cathodes in anti-parallel between said source and said primary, first biasing means connected to the control electrode of the leading path for maintaining said path non-conducting in the quiescent state of said apparatus, second biasing means connected to the control electrode of said second path for maintaining said second path non-conducting in the quiescent state of said apparatus, first counteracting means connected to the control electrode of said leading path for impressing a first potential to counteract the potential of said first biasing means during a predetermined number of alternate half-periods of said source during which said leading path may conduct, and second counteracting means connected to the control electrode of said following path for impressing a second potential for counteracting the potential of said second biasing means during an intervening predetermined number of half-periods of said source during which said following path may conduct, the said apparatus being characterized by first biasing means which is responsive to the first counteracting means to render the leading path conducting at an instant late in the first of said alternate half-periods and at instants earlier in the succeeding half-periods.

2. Apparatus according to claim 1 wherein the first biasing means includes means for impressing a first bias component and means for impressing a second bias component including charge storing means, an asymmetrically conducting network connecting said storing means between the anode and the cathode of the following path for charging said charge storing means during the half-periods when the cathode of the leading path is electrically positive relative to said anode, and means for discharging said storing means at a predetermined rate, and wherein the first counteracting potential is substantially larger than said first component and predetermined rate is such that said second component becomes such as to permit said leading path to conduct at the instant late in the first alternate half-period in the absence of said first component.

3. Apparatus according to claim 1 wherein the first biasing means includes charge storing means, asymmetrically conducting means connecting said charge storing means between the anode and cathode of the following path to charge the storing means during the half-periods when said cathode is electrically negative relative to said anode and adjustable means for discharging the charge storing means at a predetermined rate.

4. In combination an electric discharge device having an anode, a cathode and a control electrode, a first network for supplying a biasing potential, a second network for supplying a biasing potential, means connecting said networks in series between said control electrode and said cathode, and means for counteracting the potential of said first network, the said combination being characterized by a first network including a rectifier through which the biasing potential is supplied and by counteracting means including means for blocking conduction through said rectifier.

5. In combination an electric discharge device having a control electrode, an anode and a cathode, a network for supplying a bias potential, means connecting said network between said control electrode and said cathode, and means for counteracting said bias potential, the said combination being characterized by a network including a rectifier through which said bias potential is impressed and by counteracting means including means for blocking conduction through said rectifier.

6. The combination according to claim 5 characterized by a network including in addition to the rectifier, a first resistor and first means for impressing an alternating potential, by counteracting means including a second resistor and second means connected to said second resistor for impressing across said second resistor an alternating potential substantially in opposite phase to, and of higher magnitude than, the potential impressed by said first means and by means connecting said first means, the first resistor, the second resistor and the rectifier in series.

7. In combination a first electric discharge device having an anode, a cathode and a control electrode, a second electric discharge device having an anode, a cathode and a control electrode, terminals for supplying an alternating potential, load terminals, means connecting said anode and cathodes in inverse parallel between said supply terminals and said load terminals, first biasing means connected to said control electrode of said first device for supplying a first biasing potential to maintain said first device non-conducting, first counteracting means connected to the control electrode of said first device for supplying a potential to counteract said biasing potential, said counteracting means being deenergized in the standby condition of said combination, a time constant network, second biasing means, second counteracting means, means connecting in series between said control electrode and cathode of said second device, said second biasing means, said network and said second counteracting means, said second biasing means impressing a second biasing potential between said control electrode and cathode of said second device to maintain said second device non-conducting, said second counteracting means impressing a potential to counteract said second biasing potential, said network when charged superimposing an additional biasing potential on said second biasing potential and when permitted to discharge permitting said potential to decay to a low magnitude permitting conduction of said second device, in the absence of said second biasing potential on its control electrode, in an interval of the order of a period of said alternating potential, said second counteracting means being deenergized in the standby condition of said combination, means connected to said network for charging said network by the potential across the anodes and cathodes of said devices, but only during the intervals when the anode of said first device is electrically positive relative to its cathode, means for energizing said counteracting means for said first biasing means, and means for energizing said counteracting means for said second biasing means.

8. The combination according to claim 7 wherein the energizing means for the first and second counteracting means are actuated simultaneously.

References Cited in the file of this patent

UNITED STATES PATENTS

| | | |
|---|---|---|
| 2,547,228 | Owens et al. | Apr. 3, 1951 |
| 2,577,411 | Faulk | Dec. 4, 1951 |
| 2,600,941 | Undy | Jan. 17, 1952 |
| 2,676,297 | Hills | Apr. 20, 1954 |
| 2,679,021 | Hartwig et al. | May 18, 1954 |